US007039306B2

(12) United States Patent
White et al.

(10) Patent No.: US 7,039,306 B2
(45) Date of Patent: May 2, 2006

(54) FILM CANISTER DEVICE FOR USE IN A FILM PACKAGE ASSEMBLY AND A METHOD FOR LOADING A CAMERA THEREWITH AND A CAMERA LOADABLE THEREBY

(75) Inventors: Terry D. White, West Bend, WI (US); Kevin M. Gerrits, Cedarburg, WI (US)

(73) Assignee: West Bend Film Company LLC, West Bend, WI (US)

( * ) Notice: Subject to any disclaimer, the term of this patent is extended or adjusted under 35 U.S.C. 154(b) by 0 days.

(21) Appl. No.: 10/897,942

(22) Filed: Jul. 23, 2004

(65) Prior Publication Data

US 2005/0008357 A1 Jan. 13, 2005

Related U.S. Application Data

(63) Continuation of application No. 10/237,864, filed on Sep. 9, 2002, now Pat. No. 6,785,467, which is a continuation of application No. 09/877,524, filed on Jun. 8, 2001, now Pat. No. 6,447,176, which is a continuation-in-part of application No. 09/519,044, filed on Mar. 3, 2000, now abandoned.

(60) Provisional application No. 60/122,908, filed on Mar. 5, 1999.

(51) Int. Cl.
*G03B 17/02* (2006.01)
*G03B 17/26* (2006.01)

(52) U.S. Cl. .......................................... 396/6; 396/511
(58) Field of Classification Search .................... 396/6, 396/511–516; 242/160.1, 160, 348, 348.4
See application file for complete search history.

(56) References Cited

U.S. PATENT DOCUMENTS

| 1,245,760 | A | 11/1917 | Moxon |
| 2,126,312 | A | 8/1938 | Crumrine |
| 2,506,484 | A | 5/1950 | Bierhorst |
| 2,511,383 | A | 6/1950 | Summers |
| 2,557,297 | A | 6/1951 | Lea |
| 2,612,092 | A | 9/1952 | Heyer et al. |
| 2,933,027 | A | 4/1960 | Hollingworth et al. |
| 2,940,232 | A | 6/1960 | Wallace et al. |
| 3,037,719 | A | 6/1962 | Bemmann |
| 3,138,084 | A | 6/1964 | Harvey |
| 3,143,050 | A | 8/1964 | Winkler et al. |
| 3,247,773 | A | 4/1966 | Doblin et al. |
| 3,260,183 | A | 7/1966 | Winkler et al. |

(Continued)

FOREIGN PATENT DOCUMENTS

AU           284082         6/1968

(Continued)

OTHER PUBLICATIONS

"Fuji puts a lens-fitted photographic film package on sale", Japan Economic News, p. 8, May 28, 1986.

(Continued)

*Primary Examiner*—Christopher Mahoney
(74) *Attorney, Agent, or Firm*—Kaplan Gilman Gibson & Dernier LLP

(57) ABSTRACT

Provided is a film package assembly to be used within a camera such that conventional winding and rewinding components are eliminated. Provided is a film package assembly which includes a new light-tight film canister device, a roll of film and a film take-up cartridge. The film package assembly being designed so as to be loadable within a camera in non-darkroom or lighted conditions.

15 Claims, 6 Drawing Sheets

U.S. PATENT DOCUMENTS

| | | | |
|---|---|---|---|
| 3,276,714 A | 10/1966 | Steisslinger et al. | |
| 3,347,142 A | 10/1967 | Steisslinger | |
| 3,364,552 A | 1/1968 | Napor et al. | |
| 3,412,662 A | 11/1968 | Balalis | |
| 3,460,449 A | 8/1969 | Eagle | |
| 3,511,153 A | 5/1970 | Steisslinger et al. | |
| 3,585,913 A | 6/1971 | Lange | |
| 3,586,258 A | 6/1971 | Horlezeder | |
| 3,648,582 A | 3/1972 | Nerwin | |
| 3,650,194 A | 3/1972 | Penick | |
| 3,685,414 A | 8/1972 | Good | |
| 3,731,586 A | 5/1973 | Meazza | |
| 3,752,050 A | 8/1973 | Wolfe | |
| 3,782,259 A | 1/1974 | Noble | |
| 3,787,954 A * | 1/1974 | Gade et al. | 29/430 |
| 3,896,467 A | 7/1975 | Hamada | |
| 3,906,535 A | 9/1975 | Takahama et al. | |
| 3,910,692 A | 10/1975 | Scibilia | |
| 4,114,172 A | 9/1978 | Yao | |
| 4,176,701 A | 12/1979 | Welgan | |
| 4,208,117 A | 6/1980 | Harvey et al. | |
| 4,247,600 A | 1/1981 | Adachi | |
| 4,268,150 A | 5/1981 | Chen | |
| 4,274,726 A | 6/1981 | Yoneyama et al. | |
| 4,313,538 A | 2/1982 | Bauer et al. | |
| 4,344,685 A | 8/1982 | Milatz et al. | |
| 4,397,535 A | 8/1983 | Harvey | |
| 4,601,562 A | 7/1986 | Yoneyama et al. | |
| 4,609,271 A | 9/1986 | Watanabe | |
| 4,668,070 A | 5/1987 | Wakabayashi et al. | |
| 4,687,311 A | 8/1987 | Malloy Desormeaux | |
| 4,707,096 A | 11/1987 | Lawther | |
| 4,725,865 A | 2/1988 | Hoffman | |
| 4,742,366 A | 5/1988 | Nakazawa | |
| 4,831,398 A * | 5/1989 | Nakayama et al. | 396/6 |
| 4,833,495 A | 5/1989 | Ohmura et al. | |
| 4,855,774 A | 8/1989 | Ohmura et al. | |
| 4,884,087 A | 11/1989 | Mochida et al. | |
| 4,890,130 A | 12/1989 | Takei et al. | |
| 4,954,857 A | 9/1990 | Mochida et al. | |
| 4,972,649 A | 11/1990 | Mochida et al. | |
| 4,980,713 A | 12/1990 | Fujita et al. | |
| 5,063,400 A | 11/1991 | Takei et al. | |
| 5,146,255 A | 9/1992 | Nakai et al. | |
| 5,148,198 A | 9/1992 | Shiba | |
| RE34,168 E | 1/1993 | Ohmura et al. | |
| 5,235,364 A | 8/1993 | Ohmura et al. | |
| 5,235,366 A | 8/1993 | Kucmerowski | |
| 5,262,811 A | 11/1993 | Zander et al. | |
| 5,315,332 A | 5/1994 | Hirasaki et al. | |
| 5,343,265 A | 8/1994 | Oi et al. | |
| 5,361,111 A | 11/1994 | Yamashina et al. | |
| 5,381,200 A | 1/1995 | Takagai | |
| 5,381,201 A | 1/1995 | Chan | |
| 5,408,288 A | 4/1995 | Ogura et al. | |
| 5,432,572 A | 7/1995 | Hirasaki et al. | |
| 5,436,685 A | 7/1995 | Yamashina | |
| 5,437,828 A | 8/1995 | Shimizu et al. | |
| 5,452,033 A | 9/1995 | Balling et al. | |
| 5,548,364 A | 8/1996 | Muramatsu et al. | |
| 5,686,887 A | 11/1997 | Chen et al. | |
| 5,689,733 A | 11/1997 | Zawodny et al. | |
| 5,721,964 A | 2/1998 | Pearson | |
| 5,725,170 A | 3/1998 | Yamaguchi | |
| 5,758,198 A | 5/1998 | Watkins et al. | |
| 5,832,311 A | 11/1998 | Zawodny et al. | |
| 5,862,413 A | 1/1999 | Stiehl | |
| 5,862,414 A | 1/1999 | Zawodny et al. | |
| 5,875,358 A | 2/1999 | Yamaguchi | |
| 5,933,657 A | 8/1999 | Watkins et al. | |
| 6,427,050 B1 | 7/2002 | Chan | |
| 2003/0007791 A1 | 1/2003 | Chan | |
| 2005/0117901 A1* | 6/2005 | Chan | 396/512 |

FOREIGN PATENT DOCUMENTS

| | | |
|---|---|---|
| DE | 949324 | 9/1956 |
| DE | 172 354 | 3/1968 |
| DE | 81 31 086.2 | 2/1982 |
| EP | 0 095 148 A2 | 11/1983 |
| GB | 445907 | 4/1936 |
| GB | 448127 | 6/1936 |
| GB | 607242 | 8/1948 |
| GB | 684704 | 12/1952 |
| GB | 1060937 | 3/1967 |
| GB | 1462353 | 1/1977 |
| GB | 2093200 A | 8/1982 |
| GB | 2138580 A | 10/1984 |
| JP | 36242 | 12/1972 |
| NL | 6708486 | 3/1968 |
| TH | 024747 | 12/1994 |

OTHER PUBLICATIONS

Siwolop, S., "It Takes Pictures Without a Camera", International Business Week, p. 92, Jun. 16, 1986.

Lothrop, Jr., E., "Throwaway Cameras", Popular Photography, pp. 54-56 and 134, Dec. 1988.

* cited by examiner

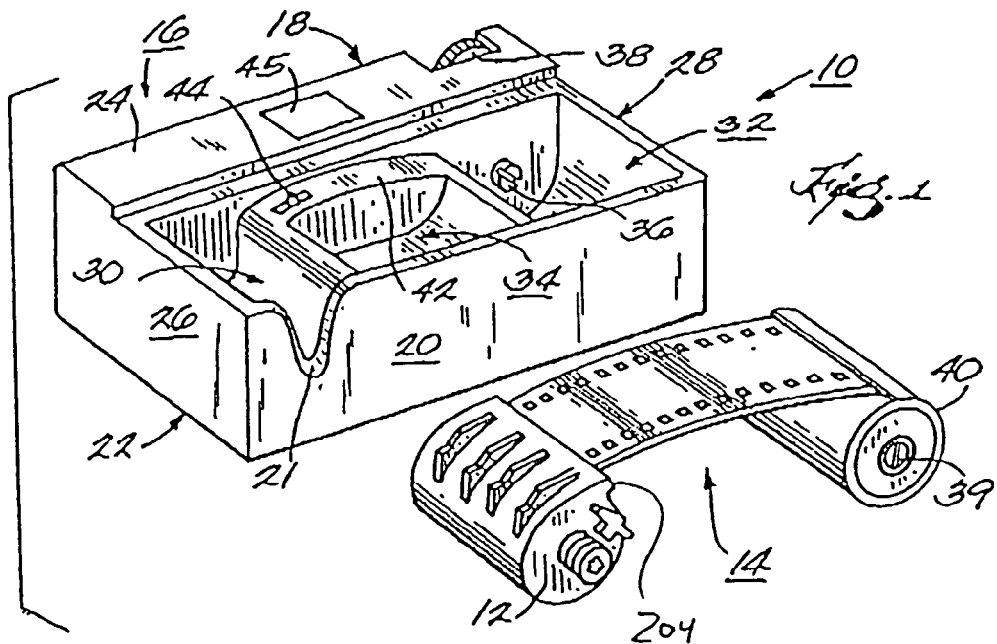

FILM CANISTER DEVICE FOR USE IN A FILM PACKAGE ASSEMBLY AND A METHOD FOR LOADING A CAMERA THEREWITH AND A CAMERA LOADABLE THEREBY

This is a continuation of U.S. patent application Ser. No. 10/237,864, filed Sep. 9, 2002, now U.S. Pat. No. 6,785,467, which is a continuation of U.S. application Ser. No. 09/877,524, filed Jun. 8, 2001 and now issued as U.S. Pat. No. 6,447,176, which is a continuation-in-part of U.S. patent application Ser. No. 09/519,044, filed Mar. 3, 2000, now abandoned, which claims the benefit of U.S. Provisional Application No. 60/122,908, filed Mar. 5, 1999, the entire disclosures of which are hereby incorporated by reference.

BACKGROUND OF THE PRESENT INVENTION

The present invention relates generally to photographic film packages and methods for loading the same into associated cameras such as 35 mm cameras, single-use cameras, APS cameras, or the like. The present invention also relates generally to cameras which facilitate the loading of the film packages according to the present invention.

Various types of cameras such as those mentioned above are well known in the art. Typically, each type of camera utilizes a somewhat unique method of loading a particular film package into the camera. In conventional cameras, such as conventional 35 mm cameras, film is generally loaded from the back of such cameras by opening a back door thereto, placing a film cartridge loaded with film into the camera, pulling a film leader of the film extending from the cartridge across the inside of the camera, engaging the film leader on a wind-up spool or similar device, and then closing the back door. Once loaded, the film from the cartridge may be wrapped around the wind-up spool as individual frames are exposed for picture taking, and after all of the frames have been exposed, the film may be manually or mechanically drawn back into the film cartridge for further film processing. Rewinding the exposed film back into the film cartridge requires certain necessary rewinding equipment which adds to the overall complexity of these types of cameras and also increases manufacturing costs. Alternatively, once loaded, the film from the film cartridge may be manually or mechanically advanced to a storage chamber of the camera which houses the wind-up spool or similar device prior to exposing the individual frames of the film for picture taking. Cameras which utilize this method of loading must incorporate certain necessary winding equipment which also adds additional components and manufacturing costs to such cameras. Film for these types of conventional cameras is normally contained and sold in a single film cartridge. Conventional cameras such as those just described are designed to remove film from these single film cartridges and at some point in time prior to removing the film from the camera for further film processing, winding or rewinding the exposed frames of the film back into the same single film cartridge.

So called single-use cameras are becoming extremely popular in the market place and are well known to those skilled in the art. As the name implies, single-use cameras are manufactured and sold with the intent of being used only a single time (i.e., with only one roll of pre-loaded film) by the purchaser or ultimate user. Typically, taking into account manufacturing costs and their intended use, single-use cameras are usually made of plastic. Film is preloaded into single-use cameras during manufacturing prior to sale and then the cameras are sealed closed. The film is loaded into the back of single-use cameras in much the same way as film is loaded into conventional 35 mm cameras, thus having the same attendant problems as mentioned above for conventional 35 mm cameras.

Single-use cameras are usually sealed by securely assembling a back cover to each camera with a locking mechanism such as screws, adhesive, thermal bonding, etc., so that the back cover cannot be easily removed. As generally understood, film cannot be removed from a single-use camera without destroying at least part of the camera. It is intended that the camera user return the entire camera, intact, to a developing lab for film processing after the user is finished taking pictures. The lab will remove the exposed film and discard the camera body. There is a large commercial market for recycling discarded single-use cameras for resale.

U.S. Pat. No. 4,972,649 describes a single-use camera where film is withdrawn from a film cartridge and wound into a roll after which the roll of film and the film cartridge are loaded into the camera. One problem with the loading method described in the '649 patent is that in order to prevent the film from being prematurely exposed, the loading of the film into the camera must take place in darkroom conditions. Such a requirement presents problems for those situations where darkroom conditions are not easily or economically available such as, for example, the single-use camera recycling industry. Moreover, another problem with the loading method described in the '649 patent is that because of the requirement of loading film in darkroom-like conditions, the typical consumer is prevented from reloading film into a single-use camera for subsequent use.

Advanced Photo System cameras or APS cameras utilize what is commonly referred to as a film safe cartridge which has a light lock door and does not, at the time of purchase, or at the time that film is first inserted into a camera, have a film leader extending from the cartridge to facilitate film loading. Film is loaded into and removed from these cameras via a film cartridge opening normally disposed on the bottom of the cameras. The light lock door of the film cartridge is usually automatically opened by the camera after the film has been loaded. The camera then drives the film out of the cassette and into a film storage or spool area on the opposite side of the camera from the film cartridge storage area. Before the film cartridge can be removed from the camera, the camera rewinds the film back into the film safe cartridge and then closes the light lock door to prevent the film inside the cartridge from being undesirably exposed. Although APS cameras provide certain advantages when it comes to protecting film from unwanted exposure, APS cameras generally include complex internal mechanisms which are designed to open and close the light lock door of the film safe cartridges.

As is well known in the art, 110 and 126 cameras use, respectively, 110-size film and 126-size film. Film for these types of cameras is sold in light-tight film packages which incorporate a pair of light-tight cartridges separated by a solid bridge. Film is contained in one cartridge prior to exposure and advanced into the other cartridge as individual frames of film are exposed for picture taking and thereafter advanced. Once all of the film has been exposed and transferred from one cartridge to the next, the film package is removed for further film processing. As is well known in the art, 110 and 126 cameras are standardized in that any 110-size film package or 126-size film package can be placed in any 110 camera or 126 camera because all of such cameras are designed to include similar dimensions. Thus, one 110-size film package or one 126-size film package is the same as the next 110-size film package or the next 126-size film package. Stated differently, 110 cameras and 126 cameras are built or manufactured around the film packages for 110-size or 126-size film. One problem with these types of film packages is that although such prior rigid double cartridge film package systems work well for the standardized 110 cameras and 126 cameras, such rigid double cartridge systems are not well suited for other conventional cameras such as 35 mm cameras which are not standardized. Thirty-five mm cameras come in all kinds of different shapes and sizes where the length of film between chambers located on opposite sides of an exposure frame varies in significant amounts. Thus, a rigid double cartridge system, like a 110 or 126 rigid double cartridge, for one 35 mm camera would not necessarily fit or work in a different 35 mm camera.

Notwithstanding the many known film systems, there is a need for a new and improved camera which eliminates the need for complicated internal mechanical winding and rewinding systems normally used for film placed therein, thereby reducing costs associated with manufacturing cameras of the type contemplated for use according to the present invention. There is also a need for a view film package for use with such a new camera which is ready for use once placed within a camera without having to pre-wind film into a storage or spool compartment as is currently done for many known cameras. Moreover, there is also a need for a new film package which does not require rewinding of film back into a film cartridge for further processing after all of the frames have been exposed prior to removing the film from the camera as is currently done for many other known cameras. What is further needed is a method for loading a new film package into a compatible camera in which the film can be easily and reliably installed in non-darkroom like conditions. What is also needed is a new film package assembly which is capable of use in conventional cameras having different internal components, shapes and sizes. What is needed is a film package assembly which is adapted for use in cameras of varying dimensions rather than having the situation where certain dimensions of the cameras are controlled by the particular film package used therein as is currently the case for many known camera systems. The present invention accomplishes these and other goals.

SUMMARY OF THE INVENTION

A camera in accordance with the invention suitably includes a housing or frame, a first chamber on one side of an exposure frame and a second chamber on an opposite side of the exposure frame. A film package comprising a light-tight film canister device holding a roll of film, and a film cartridge in which one end of the roll of film is securely positioned, is placed within the camera such that the first chamber receives the light-tight film canister device and the second chamber receives the film cartridge. A filmstrip extends from the light-tight film canister across the exposure frame to the film cartridge. As the individual frames of the film are exposed, a scroll of exposed film is formed within the film canister which, when all of the frames have been collected therein, is removed from the camera for further film processing.

In accordance with the present invention, such a camera is characterized in that a film package according to the present invention may be installed into the camera in non-darkroom like conditions. In accordance with the present invention, such a camera is characterized in that winding and rewinding mechanisms generally found within prior cameras are unnecessary when used in combination with a film package assembly according to the present invention. In accordance with the present invention, such a camera is characterized in that consumers will now be able to purchase a film package assembly according to the present invention so that a camera according to the present invention is capable of repeated use. Stated differently, because consumers will be able to purchase a ready-to-use film package assembly according to the present invention, single-use cameras can be converted to multiple-use cameras without camera manufacturers having to significantly modify current single-use cameras.

A film canister device in accordance with the present invention may include a film holding portion having a film discharge opening and a closing device for sealing the film discharge opening shut until such time as a film package assembly is ready for placement in a camera. Prior to loading a film package assembly according to the present invention into a camera, a roll of film is withdrawn from a standard film cartridge or from a bulk roll of film and placed within the film canister device. The film canister device is designed such that once assembled, the film canister device provides a light-tight container to protect the film housed therein from undesirable exposure. Once assembled, the film package assembly may be pre-loaded into a camera by a camera assembler or manufacturer for distribution and sale. Or, once assembled, the film package assembly itself may be distributed and sold for ultimate loading into a camera by the end user. In any case, the film canister device is designed such that the closing device may be opened, adjusted or removed in daylight conditions to open the film discharge opening when it is desirable to place a film package assembly within a camera without appreciably damaging the film housed within the film canister device.

A film package assembly in accordance with the present invention may be capable of placement within cameras having varying dimensions, such as conventional 35 mm cameras. Preferably, the film package assembly according to the present invention is not limited for use in what are commonly known as standardized cameras.

Accordingly, it is a feature of the present invention to provide an improved camera which accepts a ready-to-use film package assembly and advances the film contained therein frame by frame without having to wind or rewind the film either before or after exposing the individual frames of the film for picture taking prior to removing the film from the camera for further film processing.

It is another feature of the present invention to provide a film package assembly which makes it possible to install the film package assembly into and remove the film package from a camera under lighted conditions.

It is yet another feature of the present invention to provide a new apparatus and method for loading film into a camera.

Other features and advantages of the invention will become apparent to those skilled in the art upon review of the following detailed description, claims, and drawings in which like numerals are used to designate like features.

BRIEF DESCRIPTION OF THE DRAWINGS

FIG. 1 is an exploded perspective rear view of a camera, a film package assembly and a film canister device according to the present invention;

FIG. 2A is a perspective view of the film canister device of FIG. 1;

FIG. 2B is another perspective view of the film canister device of FIG. 1 shown in a different orientation;

Figure 1A:
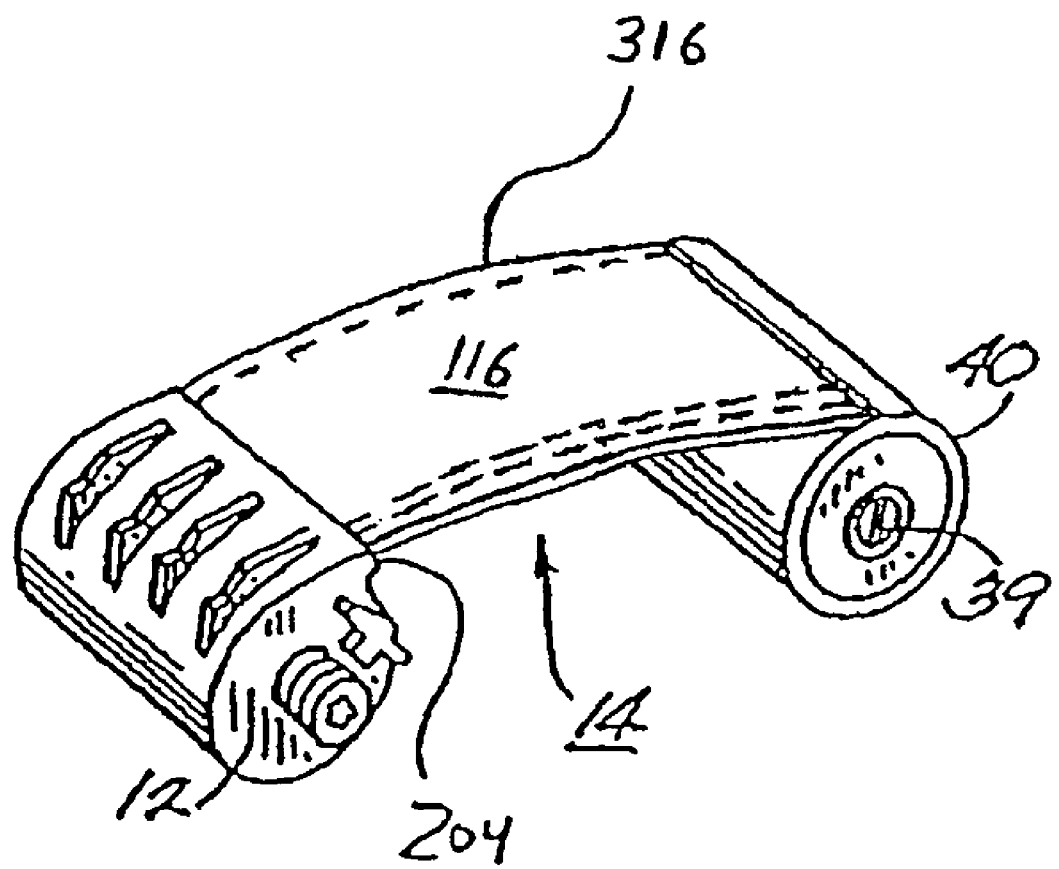
FIG. 1A shows an alternate embodiment of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter and equivalents thereof. The use of letters to identify steps of a method or process is simply for identification and is not meant to indicate that the steps should be performed in a particular order.

DETAILED DESCRIPTION OF THE PREFERRED EMBODIMENTS

FIG. 1 illustrates a camera 10, a film canister device 12 and a film package assembly 14 according to the present invention. The camera 10 may be a 35 mm camera, a single-use camera, an APS camera or any other camera which incorporates the features of the present invention. The camera 10 includes a main body 16 having a top portion 18, a bottom portion 20 having a notch 21, a front portion 22, a back portion 24, and sides 26 and 28. The back portion 24 of the main body 16 is adapted to receive a back cover (not shown) in order to enclose the film package assembly 14 within the camera 10 prior to use so as to provide a light-tight generally boxed-shaped film container. A film canister receiving chamber 30 and a film cartridge receiving chamber 32 are positioned on opposite sides of an exposure frame 34 all of which are disposed within the main body 16. A fork 36 projects inward from the top of the film cartridge receiving chamber 32 and is rotatable by an external film advancing knob 38 which is located on the top portion 18 of the main body 16. The film advancing knob 38 is usually rotatable in a counterclockwise direction as viewed in FIG. 1. The fork 36 suitably engages an end of a spool 39 located within a film cartridge 40 so as to wind individually exposed frames of the film into the film cartridge 40. The fork 36 may be replaced with any number of different advancement devices which are capable of use in conjunction with a film advancement knob 38 as known by those skilled in the art. The exposure frame 34 is formed with film guiding and supporting tracks 42 (only one of which is shown) on opposite sides thereof. A sprocket wheel 44 partially projects out from the surface of one of the tracks 42 to assist in guiding and advancing the film as pictures are taken. The camera 10 will also generally include a taking lens (not shown), a view-finder window 45, a shutter activating member (not shown), and other necessary elements known to those skilled in the art which allow the camera 10 to operate according to design.

Figure 3A:
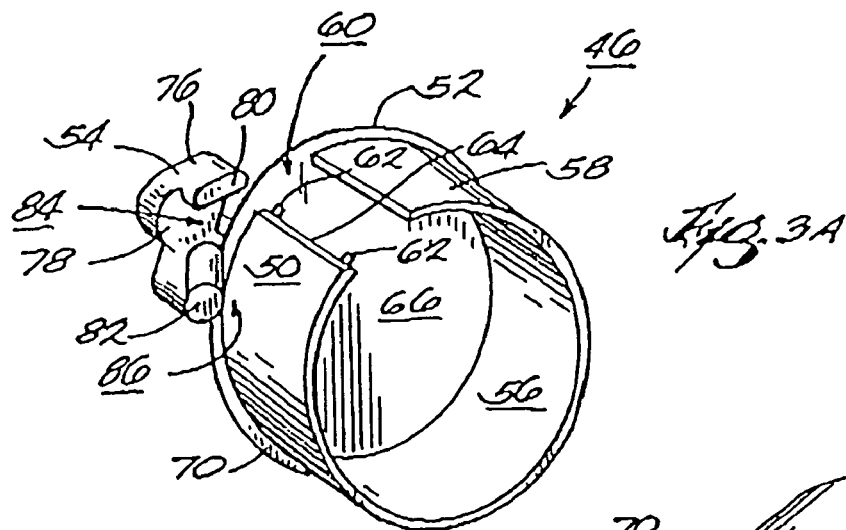
FIG. 3A is a perspective view of an inner sleeve assembly of the film canister device of FIG. 1.
Figure 3B:
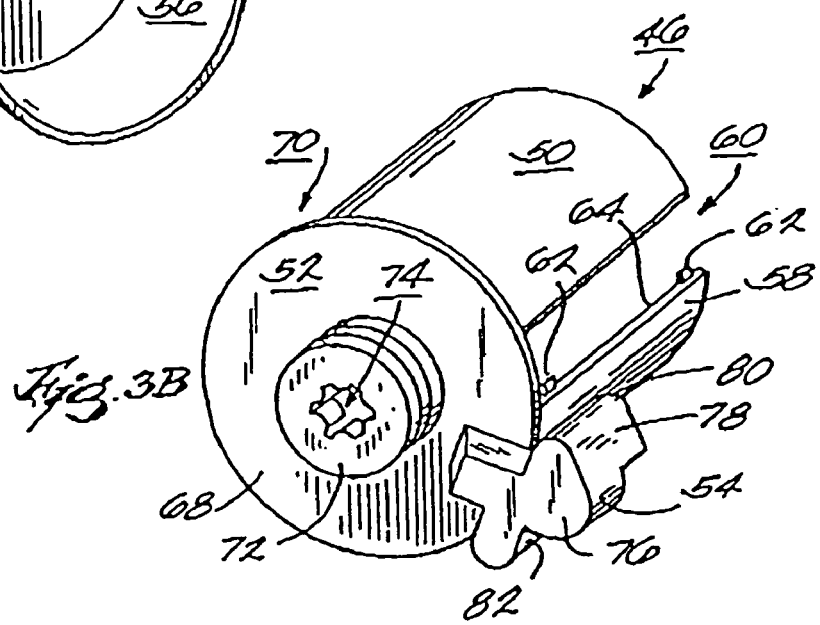
FIG. 3B is another perspective view of the inner sleeve assembly of the film canister device of FIG. 1 shown in a different orientation.
Figure 4:
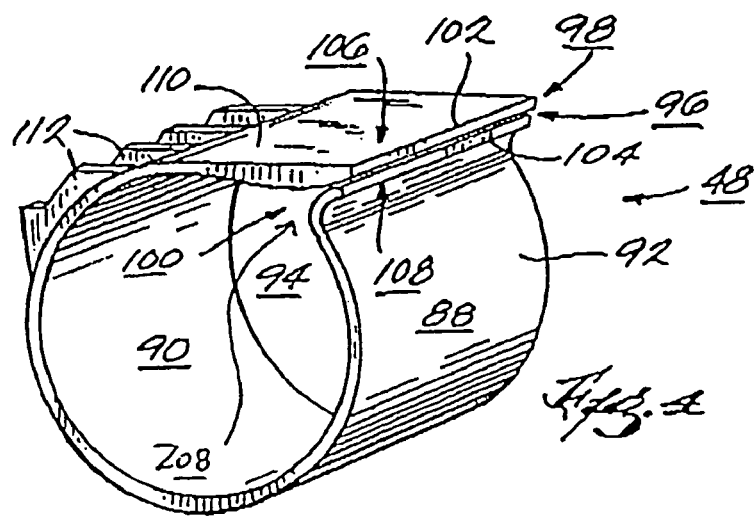
FIG. 4 is a perspective view of an outer sleeve assembly of the film canister device of FIG. 1.

The film canister device 12 of FIG. 1 is more clearly shown in FIGS. 2–4. The film canister device 12 preferably comprises an inner sleeve assembly 46 and an outer sleeve assembly 48. FIGS. 3A and 3B best illustrate the inner sleeve assembly 46 and FIG. 4 best illustrates the outer sleeve assembly 48.

Referring to FIGS. 3A and 3B, the inner sleeve assembly 46 includes a main preferably cylindrical body 50, an end cap 52 and a locking or closing mechanism 54. The main body 50 includes an inner surface 56 and an outer surface 58. An opening or a slot 60 is provided along the length of the main body 50. The slot or opening 60 is appropriately dimensioned so as to allow sufficient space for film to pass therethrough as will be further explained below. A pair of film engaging members or film catching knobs 62 protrude from a wall 64 of the slot 60. As known, rolls of film are generally provided with tracks of perforations on the lateral edges thereof for film processing purposes. The knobs 62 are spaced apart a distance which is equal to the distance between the tracks of perforations found on an accompanying roll of film. The function of the knobs 62 will be further explained below with reference to the description of loading a film package assembly 14 into a camera 10 (FIG. 1) according to the present invention.

The end cap 52 includes an inner surface 66 and an outer surface 68. One end of the main body 50 abuts against the inner surface 66 of the end cap 52. The end cap 52 is preferably generally circular and dimensioned to extend beyond the outer surface 58 of the main body 50 so as to define a lip 70. A column of material 72 extends outward from the outer surface 68 of the end cap 52. The column of material 72 includes a preferably star-shaped tool receptacle opening 74. The locking or closing mechanism 54 attaches to the outer surface 68 of the end cap 52.

The locking mechanism 54 includes a gripper portion 76 which extends outward with respect to the outer surface 68 of the end cap 52 and somewhat parallel to the column of material 72. The locking mechanism 54 also includes a locking portion 78 which extends along at least a small portion of the outer surface 58 of the main body 50 of the inner sleeve assembly 46. Preferably, the locking portion 78 includes a pair of spaced apart generally parallel fingers 80 and 82 with a slot 84 located therebetween. The fingers 80 and 82 extend along the outer surface 58 without actually coming into contact with the outer surface 58 thereby creating a space 86 between the fingers 80 and 82 and the outer surface 58.

The inner sleeve assembly 46 is preferably injected molded as a single piece of plastic material, but may be made from any number of different materials such as aluminum or other soft metals according to the features of the subject application. The main cylindrical body 50, the end cap 52 and the locking mechanism 54 could be made of two or more individual pieces assembled together with an adhesive, thermal bonding or other known ways of construction.

Figure 9:
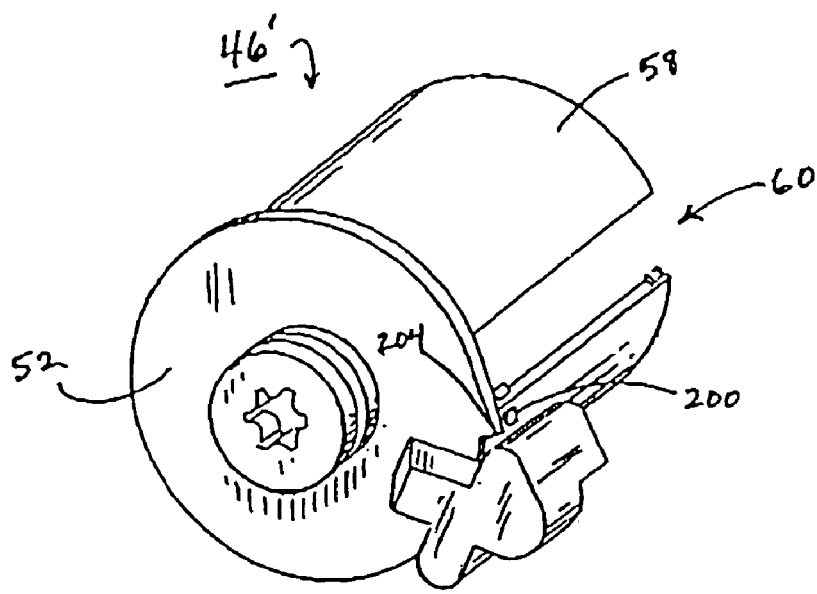
FIG. 9 is a perspective view of an alternative inner sleeve assembly of the film canister device of FIG. 1.

FIG. 9 illustrates an alternative inner sleeve assembly 46. A bump or protrusion member 200 extends from the outer surface 58 for reasons which will be explained below. A nipple 204 (see also FIG. 1) extends from the end cap 52 for reasons which will also be explained below.

With reference to FIG. 4, the outer sleeve assembly 48 includes a preferably generally cylindrical main body 88 having a generally cylindrical inner surface 90, an outer surface 92, and a back portion or wall 94. A film discharge opening 96 is provided within the main body 88 and extends along the length of the main body 88. Preferably, one end 98 of the film discharge opening 96 is closed by the back wall 94 while the other end 100 is freely openable. The film discharge opening 96 is defined by a pair of spaced apart generally parallel edges 102 and 104 which protrude outward with respect to the outer surface 92 of the main body 88 and extend along the entire length of the main body 88.

The top edge 102 includes an engagement surface 106 and the bottom edge 104 includes an engagement surface 108. As shown, a portion 110 of the outer surface 92 which includes the top edge 102 may be generally flat in nature. Also, as shown, a plurality of spaced apart ribs 112 may extend outward in a direction generally opposite that of edges 102 and 104 with respect to the outer surface 92.

The generally flat surface 110 and ribs 112 function to properly locate and hold the film canister device 12 within the film canister receiving chamber 30 of the camera 10 upon final assembly. The outer surface 92 of the main body 88 of the outer sleeve assembly 48 may take on any necessary shape and include any appropriate locating means to properly position and hold a film canister device within a respective chamber of a camera according to the present invention. Preferably, the outer sleeve assembly 48 is made of the same material as the inner sleeve assembly 46, namely, an injected molded plastic material. Preferably, the body 88 and back wall 94 are molded as a single piece of material but they may be individually formed and assembled together according to known methods. The inner sleeve assembly 46 and the outer sleeve assembly 48 are preferably opaque in nature so as to prevent unwanted exposure of the film held within the film canister device 12.

In a preferred embodiment, film cartridge 40 is a conventional 35 mm camera film cartridge and is made of metal.

FIGS. 2A and 2B show the completed assembly of the film canister device 12. As will be further explained with reference to FIG. 6 in conjunction with FIGS. 2–4, the inner sleeve assembly 46 slides within the outer sleeve assembly 48 such that the outer surface 58 of the inner sleeve assembly 46 is adapted to slide against the inner surface 90 of the outer sleeve assembly 48. When assembled, a portion of the open end of the main body 88 of the outer sleeve assembly 48 rests against the lip 70 of the end cap 52 of the inner sleeve assembly 46. In order for the inner sleeve assembly 46 to be properly positioned within the outer sleeve assembly 48, the edges 102 and 104 of the outer sleeve assembly 48 must be received by the slot 84 located between the fingers 80 and 82 of the locking mechanism 54 of the inner sleeve assembly 46. The slot 84 between the fingers 80 and 82 is dimensioned such that one finger 80 engages the engagement surface 106 and the other finger 82 engages the other engagement surface 108. When the film canister device 12 is assembled as shown in FIGS. 2A and 2B, the slot 60 (FIG. 3A) in the inner sleeve assembly 46 and the film discharge opening 96 in the outer sleeve assembly 48 are not aligned. In other words, the slot 60 and opening 96 are offset, the purpose of which will be further explained below. When assembled, the back wall 94 of the outer sleeve assembly 48, the end cap 52 of the inner sleeve assembly 46, the pinched shut film discharge opening 96 and the offset slot 60 provide a light-tight film canister device 12 which substantially prevents unwanted light from entering the canister device 12 which, if allowed, would adversely expose frames of the film stored within the canister 12.

Figure 5A:
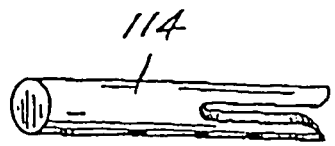
FIG. 5A is a perspective view of a winding tool adapted for use according to a method of the present invention.
Figure 5B:
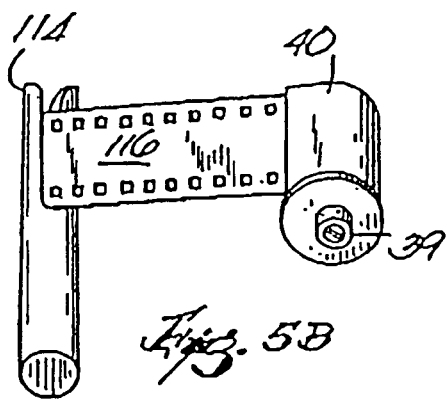
FIG. 5B is a perspective view of the winding tool of FIG. 5A with a leader portion of a roll of film attached thereto and a film cartridge originally storing the roll of film.
Figure 5C:
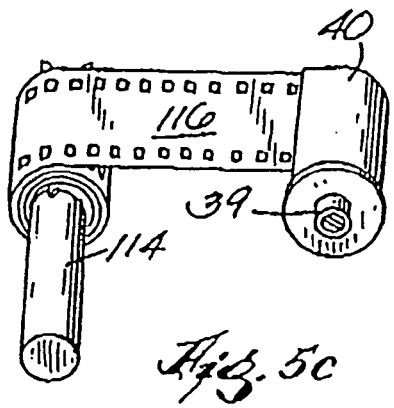
FIG. 5C is a perspective view of the components of FIG. 5B illustrating film being withdrawn from the film cartridge and wound into a roll of film about the winding tool.
Figure 6:
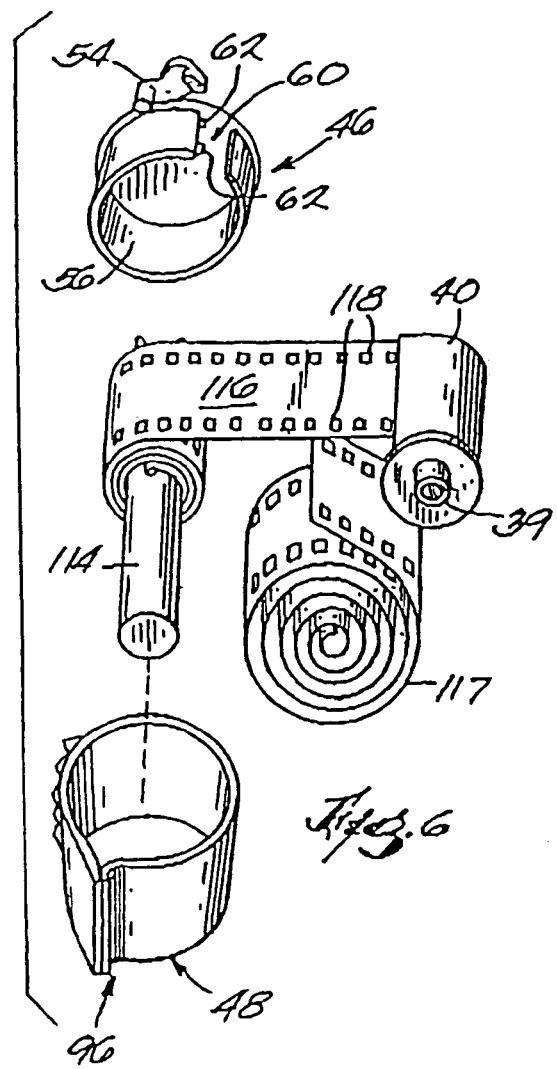
FIG. 6 is an exploded perspective view illustrating the assembly of the film package assembly of FIG. 1 according to two different aspects of the present invention.

Having described the structural relationship of the components of a film canister device 12 according to the present invention, reference is now made to FIGS. 5–6 which illustrate the assembly of a film package assembly 14 for use in a camera 10 as shown in FIG. 1. A common wind-up tool or fork 114 is shown in FIG. 5A. A film leader extends from a roll of film 116 located in a film cartridge 40 and attaches to the fork 114 as shown in FIG. 5B. The wind-up tool 114 is rotated so as to withdraw the film 116 from the film cartridge 40 and wind the film 116 into a roll of film around the tool 114 as shown in FIG. 5C. The end of the film 116 opposite the film leader is firmly fixed within the film cartridge 40 to the spool 39 so that not all of the film is withdrawn from the film cartridge 40 during the wind-up procedure. FIG. 6 illustrates that film 116 may be withdrawn from a bulk roll of film 117 instead of a film cartridge 40 and wound into a roll of film around the tool 114. A bulk roll of film may be of any length but typically contains 100–3000 feet of film. A bulk roll of film having 3000 feet of film is commonly referred to as a pancake of film as known to those skilled in the art. When using a bulk roll of film, once an appropriate amount of film is rolled around fork 114, the film 116 is cut from the bulk roll 117 and the end of the film 116 opposite the film leader, which is wound around fork 114, will be placed and firmly fixed within a film cartridge such as film cartridge 40. The film 116 may be rolled around fork 114 from any number of sources, such as, thin strips of film. In any case, the roll of film surrounding one end of the film will be placed in a light-tight film canister device and the other end of the film will be attached to a film take-up cartridge according to the principles of the present invention. So as not to prematurely expose the film 116, the wind-up procedure is performed under darkroom like conditions. Also, it should be noted that the wind-up procedure is done outside of and independent of any camera. Although FIGS. 5B and 5C seem to illustrate a manual process, the film 116 may be wound onto the winding tool 114 by other mechanical means.

Once wound onto the tool 114, the roll of film 116 is ready for placement within the film canister device 12. The wound roll of film 116 is placed within the inner sleeve assembly 46 such that a portion of the film 116 passes through the slot 60 and the winding tool 114 is removed from the roll of film 116. The inner surface 56 of the inner sleeve assembly 46 will prevent the roll of film 116 from unwinding. After the film 116 is placed within the inner sleeve assembly 46, the outer sleeve assembly 48 is slid over the inner sleeve assembly 46 to form the light-tight storage container 12 as previously described. Once assembled, the film package assembly 14 as shown in FIG. 1 is complete. It should be noted that it is envisioned that the free span of film between the film canister device 12 and film cartridge 40 shown in FIG. 1, may be covered with a piece of material, such as that indicated in FIG. 1A as 116, to act as a light-tight tube or similar device for the film to flow as the film advances from canister 12 to cartridge 14. As can be appreciated, since the slot 60 of the inner sleeve assembly 46 and the film discharge opening 96 of the outer sleeve assembly do not line up, a portion of the generally flexible film 116 will snake between the inner sleeve assembly 46 and the outer sleeve assembly 48. In this position, the knobs 62 of the inner sleeve assembly 46 will extend into a pair of perforations 118 (FIG. 6) of the film 116. In this way, the knobs 62 assist in preventing undesirable advancement of the film stored within the film canister device 12 until such time as the camera 10 is ready for use. The overall construction of the light-tight canister device 12 will prevent unwanted light from prematurely penetrating the canister 12. The film package assembly 14 is now ready for insertion within the camera 10. After the film package assembly 14 is assembled, further handling of the film package assembly can be performed in non-darkroom conditions.

With reference to FIGS. 2–6 and in particular with reference to FIG. 1, the apparatus and method according to the present invention will be explained. The camera 10 is opened in the back exposing the film canister receiving chamber 30 and the film cartridge receiving chamber 32. The locking mechanism 54 of the film canister device 12 is broken off or removed from the end cap 52 of the inner sleeve assembly 46 of the film package assembly 14. The film discharge opening 96 is now unlocked and is capable of being opened. It should be noted that the fit between the inner sleeve assembly 46 and the outer sleeve assembly 48 is such that the inner sleeve assembly 46 is not easily slid or removed from the outer sleeve assembly 48. Therefore, once the clip 54 is broken, the canister 12 will remain assembled absent an intervening force.

The film package assembly 14 is positioned within the camera 10. The film canister device 12 is received by the chamber 30 and the film cartridge 40 is received by the chamber 32. The notch 21 of the bottom portion 20 of the camera 10 receives the column of material 72 having the tool receptacle opening 74. The hole 74 is opened to the outside of the camera 10. The back cover (not shown) of the camera 10 is closed. The back cover could be a snap on type or it could be bonded to the camera 10 with adhesives or other bonding means or it could be secured with hinges for a more permanent and durable camera. An appropriately shaped tool (not shown), in this case a star shaped tool, is inserted within the tool receptacle opening 74. The tool is rotated in a predetermined direction, preferably, clockwise. The rotation of the tool will cause the inner sleeve assembly 46 to rotate within the outer sleeve assembly 48 in a clockwise direction. The outer sleeve assembly 48 is prevented from rotation by the mating relationship between the flat portion 110 and ribs 112 or like components with the surfaces of the film canister receiving chamber 30 and the back cover. The inner sleeve assembly 46 may be rotated within the outer sleeve assembly 48 by other means consistent with the teachings of the present invention. The inner sleeve assembly 46 is rotated until such time as slot 60 aligns with film discharge opening 96. So positioned, the knobs 62 of the inner sleeve assembly 46 will release the film 116 for advancement.

Figure 10:
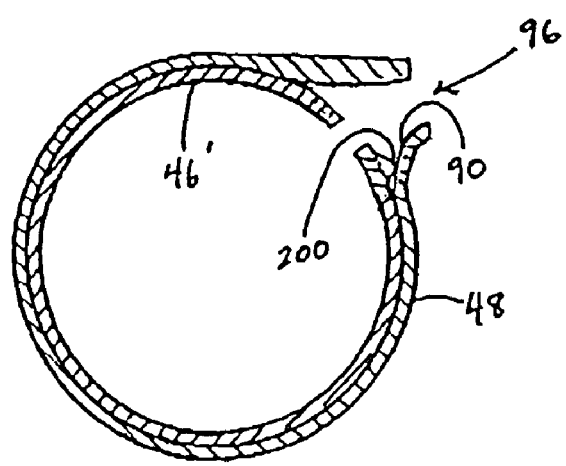
FIG. 10 is a cross-sectional view of the inner sleeve assembly of FIG. 9 positioned within the outer sleeve of the film canister device of FIG. 1.

As can be observed with reference to FIGS. 1, 4 and 9, when the film canister device 12 (FIG. 1) is light tight, the nipple 204 (FIGS. 1 and 9) closes the open end 208 (FIG. 4) of the elongated slot 96 of the outer sleeve assembly 48. With reference to FIGS. 9 and 10, when it is desirable to align the elongated slot 60 of the inner sleeve assembly 46 with the elongated slot 96 of the outer sleeve assembly 48, the inner sleeve 46 is rotated with respect to the outer sleeve 48 so that the protrusion member 200 engages the inner surface 90 of the outer sleeve 48. In this way, the elongated slot 96 of the outer sleeve 48 will be further separated to allow the film to pass therethrough without substantially scratching or otherwise damaging the film upon operation of the camera.

The film canister device 12 and the camera 10 is suitably provide with certain indicator means, such as indicator markings (not shown) which will indicate when the inner sleeve assembly 46 is properly positioned within the outer sleeve assembly 48.

Although not shown, the inner sleeve assembly 46 is preferably provided with a one-way latch device which, when activated, will prevent the inner sleeve assembly 46 from rotating any further in either direction with respect to the outer sleeve assembly 48 which, if did occur, would affect the ability of the roll of film to advance. Alternatively, a portion of the inner sleeve assembly 46 which extends out past the generally circular periphery of the end cap 52 may be caused to abut a portion of the main body 16 of the camera 10 to indicate when the inner sleeve assembly 46 is properly positioned with respect to the outer sleeve assembly 48. The film 116 is advanced through the camera 10 with the film advancing knob 38. As the film 116 advances into the film take-up cartridge 40, the film 116 is drawn across the exposure frame 34 and out of the film canister device 12. The edges 102 and 104 of the film canister device 12 are designed so as not to substantially scratch the film as the film is withdrawn out of the film canister device 12. Moreover, the slot 60 and film discharge opening 46 are properly aligned to also substantially prevent scratching of the film. After all of the frames have been exposed, the film cartridge 40 is removed for further film processing and the film canister device 12 may be discarded or recycled.

Figure 7:
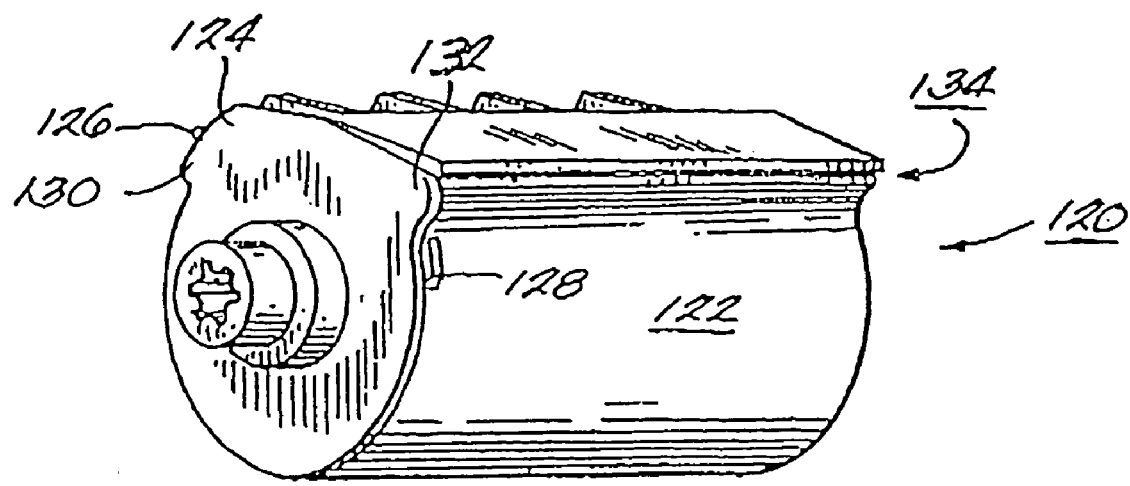
FIG. 7 is a perspective view of another embodiment of a film canister device according to the present invention.
Figure 8:
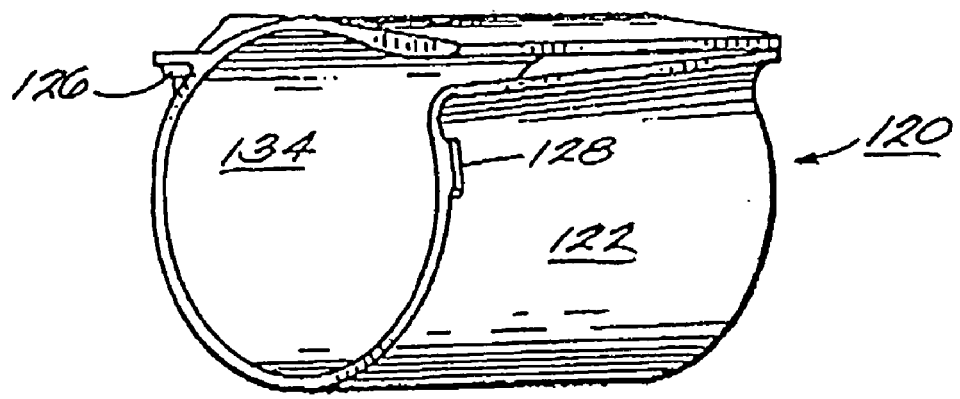
FIG. 8 is a perspective view of certain components of the film canister device of FIG. 7 with an end cap removed.

FIGS. 7 and 8 illustrate another embodiment according to the present invention. The film canister device 120 shown in FIGS. 7 and 8 is similar to the film canister device 12 shown in FIGS. 2–6 except that the inner sleeve assembly 46 of the film canister device 12 of FIGS. 2–6 is eliminated from the film canister device 120 shown in FIGS. 7 and 8. The film canister device 120 includes a preferably generally cylindrical main portion 122 and an end cap 124. The main portion 122 includes a pair of locking flanges 126 and 128. The end cap 124 includes a pair of winged portions 130 and 132. The end cap 124 suitably fits on and connects to an end of the main portion 122. Preferably, the end cap 124 is designed to snap fit onto the main portion 122. The winged portions 130 and 132 operatively cooperate with the locking flanges 126 and 128 to provide locked and unlocked positions such that film discharge opening 134 is opened and closed when desired. Many other constructions for a film canister device according to the present invention are possible. For example, a film canister device in accordance with the principles of the present invention could be constructed in a manner much like that for existing film cartridges. Importantly, such a film canister device must be a light-tight canister capable of storing a roll of film of a film package assembly but yet also capable of allowing the roll of film to be withdrawn therefrom when desired without damaging the film.

The foregoing description of the present invention has been presented for purposes of illustration and description.

Furthermore, the description is not intended to limit the invention in the form disclosed herein. Consequently, variations and modifications commensurate with the above teachings in skill or knowledge of the relevant art, are within the scope of the present invention. The embodiments described herein are further intended to explain the best modes known for practicing the invention and to enable others skilled in the art to utilize the invention as such, or other embodiments and with various modifications required by the particular applications or uses of the present invention. It is intended that the appended claims are to be construed to include alternative embodiments to the extent permitted by the prior art.

Various features of the invention are set forth in the following claims.

The invention claimed is:

1. A method comprising unwinding film from a bulk roll of film into a roll, cutting the unwound film from the remainder of film on said bulk roll such that said unwound film has a cut end, providing a cartridge having an inside, attaching the cut end inside said cartridge, and closing said cartridge, and placing said roll inside a secondary container, said secondary container not being a 35 mm conventional cartridge and said cartridge being a conventional cartridge without a roll of film in it, and winding the roll into the cartridge as pictures are taken.

2. The method of claim 1 wherein secondary container is made of plastic.

3. The method of claim 2 wherein said secondary container contains a spool.

4. The method of claim 2 further comprising removing said 35 mm cartridge from said camera for developing of said film.

5. The method of claim 4 wherein said secondary container is made of plastic.

6. The method of claim 4 wherein said secondary container has no spool.

7. The method of claim 4 wherein said secondary container contains a spool.

8. The method of claim 4 wherein said film is wound directly from a bulk roll to said secondary container by spinning said film with a fork like tool, and then from said secondary container into said cartridge, within a camera as pictures are taken, such that after all pictures are taken, the film is within the cartridge.

9. The method of claim 4 wherein said cartridge is substantially cylindrical and wherein said secondary container is of a different size than said cartridge.

10. The method of claim 1 wherein the secondary container has no spool.

11. The method of 1 wherein said cut end is connected prior to said roll being placed within said container.

12. The method of claim 1 wherein said cut end is connected after said roll is placed within said container.

13. A method comprising unwinding film from a bulk roll of film into a roll, cutting the unwound film from the remainder of film on said bulk roll such that said unwound film has a cut end, providing a cartridge having an inside, attaching the cut end inside said cartridge, closing said cartridge, inserting the roll into a container, leaving said container and cartridge disconnected so that the container and the cartridge can be installed in a camera without further steps of disconnection, and installing said container and said cartridge into a camera, said cartridge being a substantially empty, conventional 35 mm cartridge that has not contained the film in unexposed form said container being made of plastic.

14. The method of claim 13 wherein at least one of said container or said canister is substantially cylindrical.

15. The method of claim 14 further comprising leaving a length of film between said container and canister to hold same together as a unit without directly connecting said container and canister.

* * * * *